April 1, 1958

J. HIRSCH ET AL 2,828,604

ROCKET ENGINE THRUST CONTROL DEVICE

Filed Aug. 31, 1953

INVENTORS
JOSEPH HIRSCH
JACK M. POLLARD

BY

ATTORNEYS

United States Patent Office 2,828,604
Patented Apr. 1, 1958

2,828,604

ROCKET ENGINE THRUST CONTROL DEVICE

Joseph Hirsch, Pasadena, and Jack M. Pollard, Ventura, Calif.

Application August 31, 1953, Serial No. 377,740

6 Claims. (Cl. 60—35.6)

(Granted under Title 35, U. S. Code (1952), sec. 266)

The invention described herein may be manufactured and used by or for the Government of the United States of America for governmental purposes without the payment of any royalties thereon or therefor.

The present invention relates to a rocket engine thrust control device and more particularly to a rocket engine thrust control device utilizing an arrangement wherein a perforated metallic cover is suitably disposed about the exhaust nozzle of a rocket engine.

The present invention is adapted for use with rocket-type engines such as "JATO" units and the like which are employed for accelerating booster and aircraft assemblies. When such rocket engines are fired, a high initial thrust is developed thereby causing a high rate of loading upon the assembly which supports the engine. In most cases, an initial high rate of loading on booster or aircraft assemblies is disadvantageous and it is desirable to provide a device which will prevent such loading.

The invention device provides a means whereby a controlled thrust is developed by the rocket engine and a gradual rate of loading is applied to the engine's support assembly. A perforated metallic cover is suitably mounted over the exhaust nozzle of the engine such that the amount of the exhaust gases of the engine which escapes through the perforations in the cover is initially limited and subsequently increased with time whereby possible injury to the engine support assembly due to an initial high thrust of the engine is prevented.

An object of the present invention is the provision of a new and novel rocket engine thrust control device which is adapted to prevent a rocket engine from developing a high initial thrust, and which allows a gradual increase in developed thrust.

Another object is to provide a rocket engine thrust control device which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein.

Figure 1:
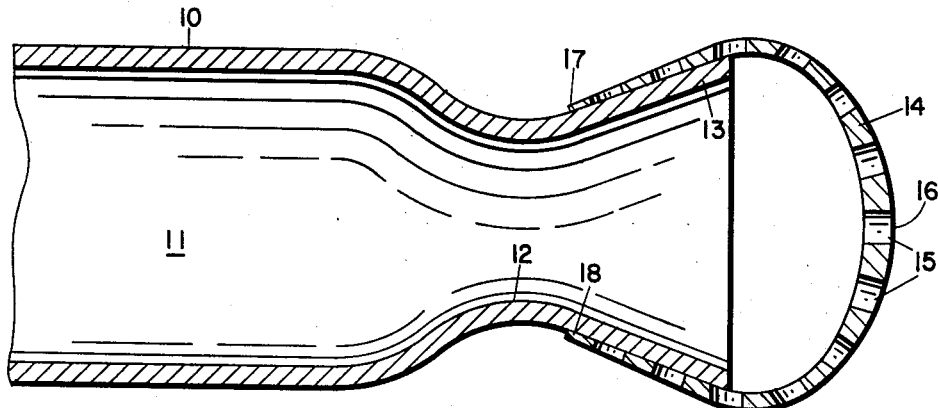
Fig. 1 shows a sectional view of a preferred embodiment of the invention.

Referring now to the drawings, wherein like reference characters designate like or corresponding parts throughout the several views, there is shown in Fig. 1 a hollow rocket engine housing or body member 10 composed of steel, cast iron or other similar hard metallic substance, and having a combustion chamber 11 formed therein. A venturi portion 12 is provided adjacent the combustion chamber and an outwardly flared conventional conical exhaust nozzle or orifice 13 is formed integral with housing 10 rearwardly of portion 12.

Figure 2:
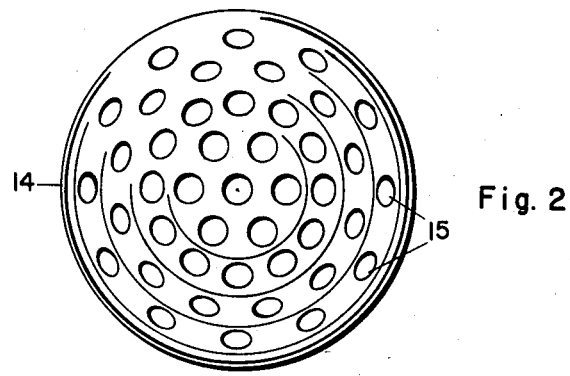
Fig. 2 is an end view of a metallic cover similar to that shown in Fig. 1.

A cover 14 formed of a ductile metal or alloy such as brass, copper or similar material is suitably disposed about the nozzle in the position shown in Fig. 1 as by crimping or the like. Cover 14 has a balloon-like or cup-shaped symmetrical configuration when in place about the exhaust nozzle and as may be seen by reference to both Figs. 1 and 2, the cover is provided with a plurality of cylindrical perforations or openings 15 which extend therethrough and are evenly and symmetrically dispersed over the entire surface thereof. The wall thickness of the cover preferably decreases toward the open end thereof, being thickest at its central portion 16 and thinnest at its outer periphery 17. The thickness of the walls of the cover will naturally depend on the size of the rocket engine and the thrust developed thereby; when employed on a rocket engine of the size developing approximately 250 pounds of thrust, the thickness of portion 16 may be on the order of one-sixteenth of an inch and the thickness of portion 18 may be on the order of one-thirty-second of an inch. That portion of the inner surface 18 of the cover which is disposed about nozzle 13 is in abutting relationship with the outer surface of the nozzle.

Figure 3:
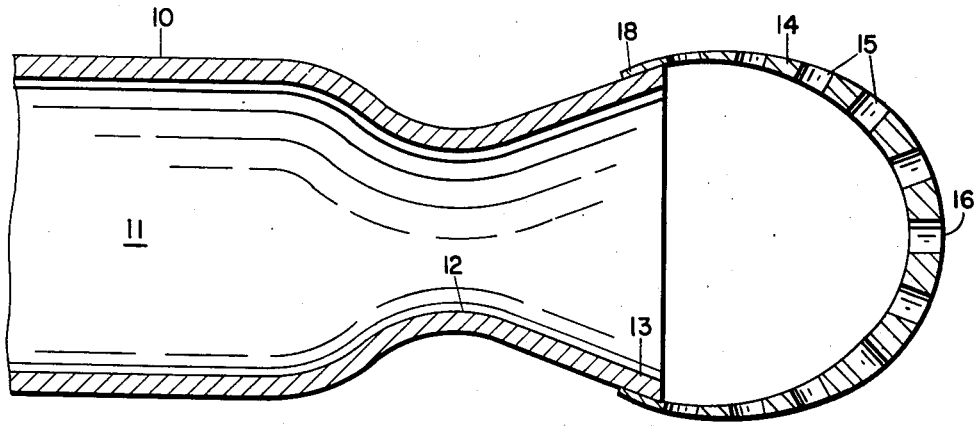
Fig. 3 illustrates a sectional view of the device shown in Fig. 1 shortly after the rocket engine is fired.

It is apparent that when the engine is initially fired, only a small amount of the exhaust gases developed by the engine can escape through openings 15 and the thrust developed by the engine is limited. As the exhaust gases build up pressure and temperature, cover 14 is deformed and moved to the position shown in Fig. 3 and is subsequently blown entirely off of the nozzle. As the cover moves to the rear, more openings 15 are exposed and a greater amount of the exhaust gases can escape thereby gradually increasing the thrust developed by the engine. When the cover is blown off the nozzle, full thrust is developed by the engine. Furthermore, the decreasing thickness of the wall of cover 14 enables the cover to be expanded by less exhaust gas pressure as the cover moves rearward. Therefore, even though a greater amount of gas escapes through the openings in the cover as the cover moves rearward and the pressure within the cover correspondingly decreases in relation to the value it would possess were it not for the progressive exposure of such cover openings, sufficient force will be present due to exhaust pressure "build up" to expand the cover and finally blow it completely off the nozzle.

Although the wall thickness of cover 14 is shown as varying, it may be constant, and the spacing, configuration and size of openings 15 may be altered to give the rocket engine a desired acceleration characteristic.

It should be noted that the invention device is particularly advantageous since the device is entirely self-contained, requiring no structural connections to the launching and support assemblies or the like. Therefore, the present invention may be employed with present booster and aircraft assemblies without any alteration in the structure or design of the assemblies.

From the foregoing, it is apparent that there is provided a new and novel rocket engine thrust control device which is adapted to prevent a rocket engine from developing a high initial thrust and which allows a gradual increase in developed thrust. The device is simple and inexpensive in construction, yet is sturdy and reliable in operation.

Obviously many modifications and variations of the present invention are possible in the light of the above teachings. It is therefore to be understood that within the scope of the appended claims the invention may be practiced otherwise than as specifically described.

I claim:

1. In combination, a body means having a chamber formed therein, a flared exhaust nozzle for said chamber, and deformable cover means of ductile material covering the nozzle opening and at least a portion of the flared outer surface thereof for controlling the escape of exhaust gases from said nozzle, said deformable cover means having a plurality of openings generally uniformly distributed over the surface thereof, whereby, as the pressure of the exhaust gases from said nozzle increases, said cover means is deformed to progressively cover a smaller portion of the outer surface of said flared nozzle and hence gradually expose a greater number of said openings, until the point is reached at which the pressure of said exhaust gases causes said cover means to be completely blown off said nozzle.

2. In combination, a rocket engine including a hollow housing having a combustion chamber formed therein, a divergent exhaust nozzle positioned adjacent said chamber, a substantially cup-shaped cover disposed about said nozzle, said cover having a plurality of openings formed therein and being composed of a ductile metallic substance whereby said cover is adapted to be deformed when said engine is fired.

3. A thrust control device for a rocket engine, said device comprising a substantially cup-shaped ductile member of progressively decreasing wall thickness toward the rim thereof, said member having a plurality of spaced openings formed therein, the rim of said member being adapted to fit over the divergent exhaust nozzle of said rocket engine, such that when the pressure of the exhaust gases from said nozzle increases, said cup-shaped member is deformed to gradually expose a greater number of said openings until the point is reached at which said member is completely blown off said nozzle.

4. A device as defined in claim 3 wherein said openings are evenly and symmetrically dispersed about the entire surface of said member.

5. In combination, a rocket engine including a hollow housing having a combustion chamber formed therein, said housing defining a venturi portion adjacent said combustion chamber, a divergent exhaust nozzle positioned adjacent said venturi portion, a substantially cup-shaped cover disposed about said nozzle for controlling the escape of exhaust gases from said nozzle, said cover being in contact with the outer periphery of said nozzle and being formed of a ductile metallic substance, said cover having a plurality of spaced openings formed therein and being so constructed and arranged that said openings are successively exposed such that the rate of escape of said gases is gradually increased.

6. In combination, a rocket engine including a hollow housing having a combustion chamber formed therein, said housing being drawn to a neck at one end adjacent said combustion chamber, an outwardly flared exhaust nozzle connected to said neck and a substantially cup-shaped cover positioned over the open end of said nozzle and being formed of a ductile metallic substance, said cover being multiply apertured substantially evenly over essentially its entire surface and having a varying wall thickness which decreases in the direction of the open end thereof, the open end portion of said cover being disposed in gas-tight frictional engagement with the outer periphery of said nozzle for a substantial distance therealong, whereby on passage of gases from said nozzle into said cover, said cover is urged outwardly exposing an increasingly larger portion of the apertured surface of said cover to said gases, thus gradually increasing their rate of escape and the thrust developed.

References Cited in the file of this patent

UNITED STATES PATENTS

| | | |
|---|---|---|
| 1,010,792 | Page | Dec. 5, 1911 |
| 1,265,309 | Dunne | May 7, 1918 |
| 1,504,144 | Romberg | Aug. 5, 1924 |
| 2,515,049 | Lauritsen et al. | July 10, 1950 |
| 2,627,160 | MacDonald | Feb. 3, 1953 |